United States Patent
Fujita et al.

[11] Patent Number: 6,108,746
[45] Date of Patent: Aug. 22, 2000

[54] SEMICONDUCTOR MEMORY HAVING AN ARITHMETIC FUNCTION AND A TERMINAL ARRANGEMENT FOR COORDINATING OPERATION WITH A HIGHER PROCESSOR

[75] Inventors: Ryo Fujita, Tokai-mura; Mitsuru Soga, Nakajyo-machi; Yasuhiro Nakatsuka, Koganei, all of Japan

[73] Assignee: Hitachi, Ltd., Tokyo, Japan

[21] Appl. No.: 08/945,575
[22] PCT Filed: Apr. 26, 1996
[86] PCT No.: PCT/JP96/01166
  § 371 Date: Oct. 31, 1997
  § 102(e) Date: Oct. 31, 1997
[87] PCT Pub. No.: WO96/35992
  PCT Pub. Date: Nov. 14, 1996

[51] Int. Cl.[7] .................................................. G06F 12/00
[52] U.S. Cl. ................................................ 711/5; 711/218
[58] Field of Search ........................................ 711/5, 218

[56] References Cited

U.S. PATENT DOCUMENTS 4,757,384 7/1988 Nonweiler et al. ..................... 358/160
5,146,834 9/1992 Izumisawa et al. .

FOREIGN PATENT DOCUMENTS

1-321574 12/1989 Japan .
4-31939 2/1992 Japan .
5-12326 1/1993 Japan .

*Primary Examiner*—Jack A. Lane
*Attorney, Agent, or Firm*—Anotnelli, Terry, Stout & Kraus, LLP

[57] ABSTRACT

A display apparatus performs pixel density conversion processing, such as enlargement, reduction, and rotation, on an original image and displays a resultant image an image processing apparatus and, more particularly, a processing apparatus, for performing a high-speed filtering operation, such as data interpolation, involving pixel density conversion processing, uses a memory having an arithmetic function for use in the high-speed filtering operation. The apparatus provides a fraction address including a fraction component of an original image that generally does not provide integer coordinates and a semiconductor memory 100 incorporates a memory cell 207 for holding data corresponding to an integer address, arithmetic circuits 202 and 203 for performing interpolation based on the data corresponding to an integer component of the fraction address read from the memory cell and the fraction component, and an address range determining block 216 for determining whether the above-mentioned given fraction address is in the range of addresses of the data held in the memory cell in the above-mentioned semiconductor memory.

20 Claims, 6 Drawing Sheets

SEMICONDUCTOR MEMORY HAVING AN ARITHMETIC FUNCTION AND A TERMINAL ARRANGEMENT FOR COORDINATING OPERATION WITH A HIGHER PROCESSOR

BACKGROUND OF THE INVENTION

The present invention relates to a display apparatus for performing pixel density conversion processing, such as enlargement, reduction, and rotation, on an original image and for displaying a resultant image, or to an image processing apparatus, and, more particularly, to a processing apparatus for performing a high-speed filtering operation, such as data interpolation, which involves pixel density conversion processing, and to a memory having an arithmetic function for use in the high-speed filtering operation.

A conventional display apparatus for performing enlargement, reduction, and rotation on an image is used in texture mapping apparatuses, such as disclosed in Japanese Non-examined Patent Publication Nos. Hei 5-298455 and Hei 5-307610. In these publications, methods are disclosed in which, when the coordinate value of an original image corresponding to its destination does not match the center of a pixel of the original image, the value of the pixel of a specified coordinate is estimated by interpolation of pixels around the specified pixel. For enlargement of a binary character image, Japanese Non-examined Patent Publication No. Sho 59-6626 discloses a method of obtaining destination pixels enlarged from plural pixels of an original image. In addition, for image differentiation and integration in image processing, a method is well known in which a product-sum operation is performed by weighting the surrounding eight pixels.

The conventional processing apparatus, such as mentioned above, for reading plural pixels from an original image for arithmetic operations has plural memory devices and arithmetic units arranged in parallel to perform parallel processing for high-speed processing.

However, when arranging plural memory devices and reading data at high speeds from an original image for processing, the above-mentioned prior-art technologies present a problem in that the number of signal lines between the processor for performing that processing and the plural memory devices is significantly increased. For example, if one pixel consists of 24 bits (red, green, and blue consisting of eight bits each) and an arithmetic operation is performed from an original image consisting of four pixels, data lines for 96 bits are required. The data reading performance of a memory device itself, if the same is an ordinary random access memory, is currently limited to 150 ns in a random access operation. In order to achieve a target performance, this access speed must be further increased by parallel processing, which in turn increases the number of signal lines still further. This inevitably increases the equipment scale as well as the equipment cost because the individual performance (operating frequency) needs to be increased.

SUMMARY OF THE INVENTION

It is therefore an object of the present invention to provide a processing apparatus which is capable of performing high-speed processing by decreasing the number of signal lines between a higher processor and memory devices and to provide a semiconductor memory having an arithmetic function for use in this processing apparatus.

Another object of the present invention is to provide a plurality of semiconductor memories having an arithmetic function and a processing apparatus for processing an original image which is too large to be stored in a single semiconductor memory having an arithmetic function.

In carrying out the invention, and according to one aspect thereof, there is provided a semiconductor memory having an arithmetic function comprising: a storage means for holding data corresponding to continuous integer addresses; a fraction address holding means for holding an integer component and a fraction component constituting a fraction address inputted from a processor; an arithmetic means for reading data corresponding to the integer component and data before or after the data from the storage means and, by use of the read data and the fraction component held in the fraction address holding means, interpolating data corresponding to the fraction address; and an address range determining means for determining whether an address is within a range of the addresses of the data held in the storage means, all of the above-mentioned means being formed on a single LSI chip.

In carrying out the invention, and according to another aspect thereof, there is provided a processing apparatus using a semiconductor memory having an arithmetic function comprising: a processing processor for generating an address including a fraction component as instructed from a higher processor; and a plurality of semiconductor memories each having an arithmetic function and including a storage means for holding data corresponding to continuous integer addresses and an arithmetic means for obtaining, for the address including a fraction component inputted from the processing processor, data corresponding to the address including a fraction component by use of the data corresponding to continuous integer addresses held in the storage means and the fraction component of the address; wherein each of the plurality of semiconductor memories holds part of data of an adjacent memory in the storage means in a mutually overlapping manner.

Conventionally, an address is outputted to plural memory devices for one coordinate, about four to 16 pixels around that coordinate are read, which are captured by the higher processor, and the higher processor performs arithmetic processing by using the values of the captured pixels. Therefore, it is required to transfer about four to 16 pixels of data between the memory device and the higher processor in order to generate output data for one pixel.

According to the present invention, the above-mentioned arithmetic processing is performed inside the LSI, so that the data of only one pixel may be transferred between the semiconductor memory having an arithmetic function and the higher processor in order to generate output data for one pixel. Inside the semiconductor memory having an arithmetic function, about four to 16 pixels of data are still transferred; but, in the actual memory device, data of several thousand bits (in the case of a 16 Mb DRAM, 16 Kbits for example) can be read simultaneously and more pixel data can be read. As for the access time for memory cells, it is necessary to drive a signal line of at least 10 PF in order to output data to the outside of a chip. Inside the LSI, at most only 1 PF of capacitance may be driven, thereby enabling high-speed access to the memory.

Further, according to the present invention, a fraction address inputted from the processor is interpolated by use of data corresponding to the integer address held in the above-mentioned storage means to obtain data corresponding to the fraction address. The following specifically describes the linear interpolation for a one-dimensional data sequence. If the value of coordinate A=10 is 100.0 and the value of cordinate A=11 is 130.0 and these values are stored in memory, the value of coordinate A=10.6 can be interpolated by multiplying the value of coordinate A=11 by 0.6 and multiplying the value of coordinate A=10 by 0.4 and adding the multiplication results together to get 118.0. Thus, the interpolation output can be obtained by uniquely determining, in a coordinate fraction component, a weight coefficient to be multiplied by each pixel and by adding the multiplication results together.

Still further, according to the present invention, a plurality of semiconductor memories each having an arithmetic function are provided and include a storage means for holding data corresponding to continuous integer addresses and an arithmetic means for obtaining data corresponding to the address including a fraction component by use of the data corresponding to continuous integer addresses held in the storage means and the fraction component of the address from the address including the fraction component inputted from the processing processor, wherein each of the plurality of semiconductor memories holds part of the data of an adjacent memory in the storage means in a mutually overlapping manner. Therefore, if the size of an original image is too large to be stored in one LSI chip, such a large memory space is divided into plural areas and each of these areas can be allocated to each of the plural semiconductor memories having an arithmetic function. In addition, part of the data is held in an overlapping manner, so that the data in proximity to the boundary between the divided areas can be well processed.

DESCRIPTION OF THE PREFERRED EMBODIMENT

The following describes one embodiment of the present invention with reference to drawings.

Figure 2A:
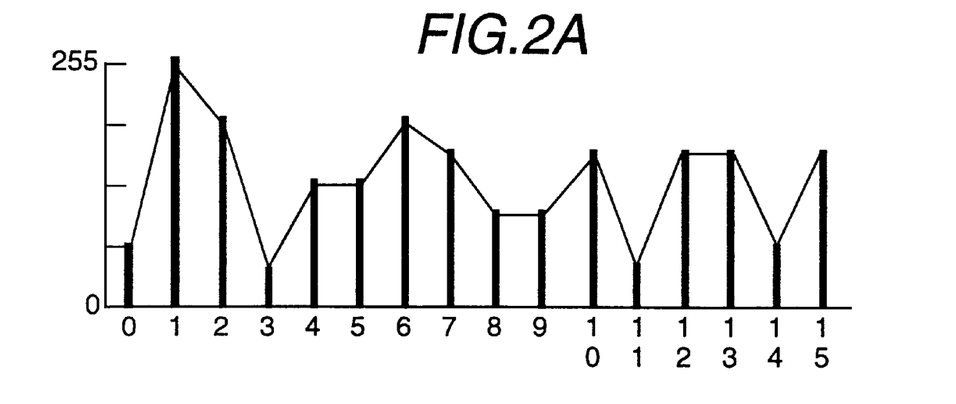
FIGS. 2(a) to 2(d) are diagrams illustrating some functions of the semiconductor memory having an arithmetic function.
Figure 2B:
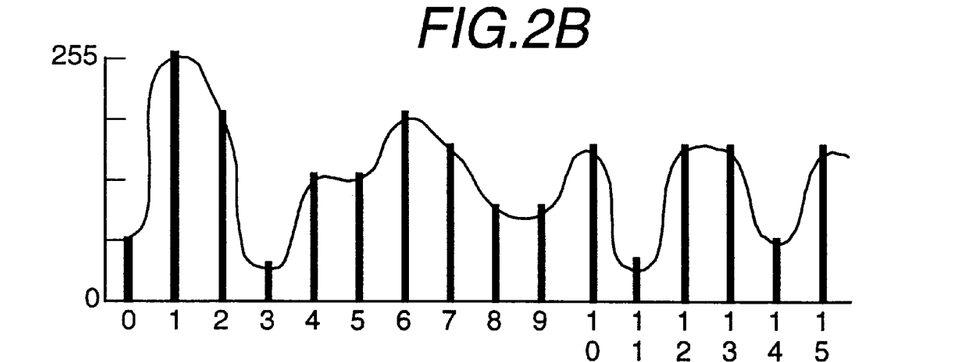

Referring to FIGS. 2(a) to 2(d), there are shown some functions of a semiconductor memory having an arithmetic function according to one embodiment of the present invention. First, FIG. 2 (a) illustrates an example of a way of interpolating a one-dimensional data sequence in a linear (linear equation) manner. The horizontal axis represents addresses while the vertical axis represents data values corresponding to the addresses. Each vertical bar represents a value set in memory, while the lines connecting the bars at their tops represent an interpolated output. Namely, if the data sequence is stored at addresses 0 through 15 in a semiconductor memory having an arithmetic function according to the present invention, specifying an address having a fraction component and reading the data from that address makes it possible to read linearly interpolated data from before and after the data specified by the address. For example, if 128 is stored at address 9 and 166 at address 10 and a read operation is performed by specifying 9.87 as an address, the semiconductor memory having an arithmetic function reads two addresses 9 and 10, which are nearest to the address 9.87, from the memory and interpolates the values of the addresses 9 and 10 by fraction component 0.87 of the specified address, thereby outputting an interpolation result. For linear interpolation, let the integer component of an address be Ti and its fraction component be Tf, then an interpolation result ip can be obtained from the following expression (1), so that, in the above-mentioned example, 161 is outputted.

$$ip = A(Ti) \times (1-Tf) + A(Ti+1) \times Tf \qquad (1)$$

where, A(x) indicates the value stored at the specified address- Next, FIG. 2 (b) illustrates an example in which the data sequence is interpolated quadratically. For linear interpolation, data between two pieces of data is calculated. For quadratic interpolation, interpolation is performed from the values of three continuous addresses, so that the values can be varied smoothly as shown in the figure. The calculation for the interpolation can be performed by the following expression (2) obtained by solving an equation.

$$ip = (A(Ti-1) \times (Tf-1) \times Tf + \qquad (2)$$
$$2 \times A(Ti) \times (1-Tf) \times (1+Tf) +$$
$$A(Ti+1) \times (1+Tf) \times Tf)/2$$

If address 9 is 128, address 10 is 166, and address 11 is 40 and a read operation is performed with an address of 9.87, since the three addresses nearest to address 9.87 are 9, 10, and 11, Ti=10, Tf=−0.13, so that ip=170.

Figure 2C:
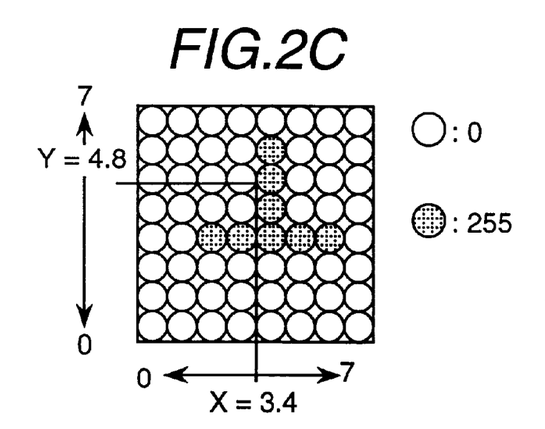
Figure 2D:
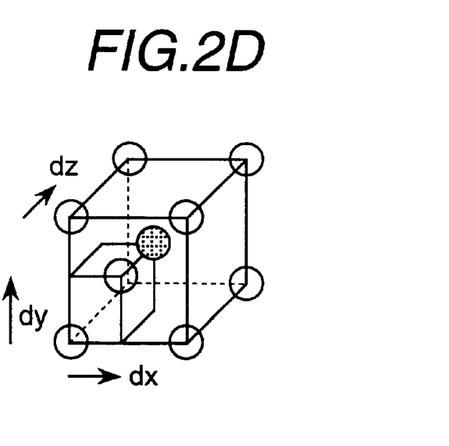

FIG. 2 (c) illustrates an example in which a quadratic data sequence is interpolated and an interpolation result is outputted. It is assumed that the memory is accessible by quadratic addresses (coordinates) and the data (pixel) for each of the addresses is eight bits. In the figure, the value of eight pixels, of which the X and Y coordinates are (2,3), (3,3), (4,3), (5,3), (6,3), (4,4), (4,5) and (4,6), is set to 255, and the other pixels are set to 0. If X=3.4 and Y=4.8 are specified and this semiconductor memory having an arithmetic function is read, the values of the pixels whose coordinates are (3,4), (3,5), (4,4), and (4,5) are read for interpolation and an interpolation result is outputted in the case of linear interpolation. If the integer parts and the fraction parts of the coordinates X, Y to be read are TXi, TXf and TYi, TYf, then the interpolation result ip can be obtained from the following expression (3).

$$ip = A(TXi, TYi) \times (1-TXf) \times (1-TYf) + \qquad (3)$$
$$A(TXi+1, TYi) \times TXf \times (1-TYf) +$$
$$A(TXi, TYi+1) \times (1-TXf) \times TYf +$$
$$A(TXi+1, TYi+1) \times TXf \times TYf$$

Therefore, in the example of FIG. 2(c), ip=102.

FIG. 2 (d) illustrates an example in which a three-dimensional data sequence is interpolated and an interpolation result is outputted. This figure shows an example of linear interpolation. The semiconductor memory having an arithmetic function uses eight pixels around a specified coordinate (a dot in the figure) and an offset (dx, dy, dz) from an integer grid to perform interpolation in the same manner as in the above-mentioned one-dimensional and two-dimensional interpolating operations.

So far, the capability of a semiconductor memory having an arithmetic function has been described with attention mainly paid to linear interpolation. Like the above-mentioned expression (2), a weight coefficient for data can be obtained from the fraction component of an address to interpolate values by higher-degree functions, such as quadratic and cubic functions. Further, if the obtained weight coefficient is fixed, a Laplacian filter can be implemented.

Figure 1:
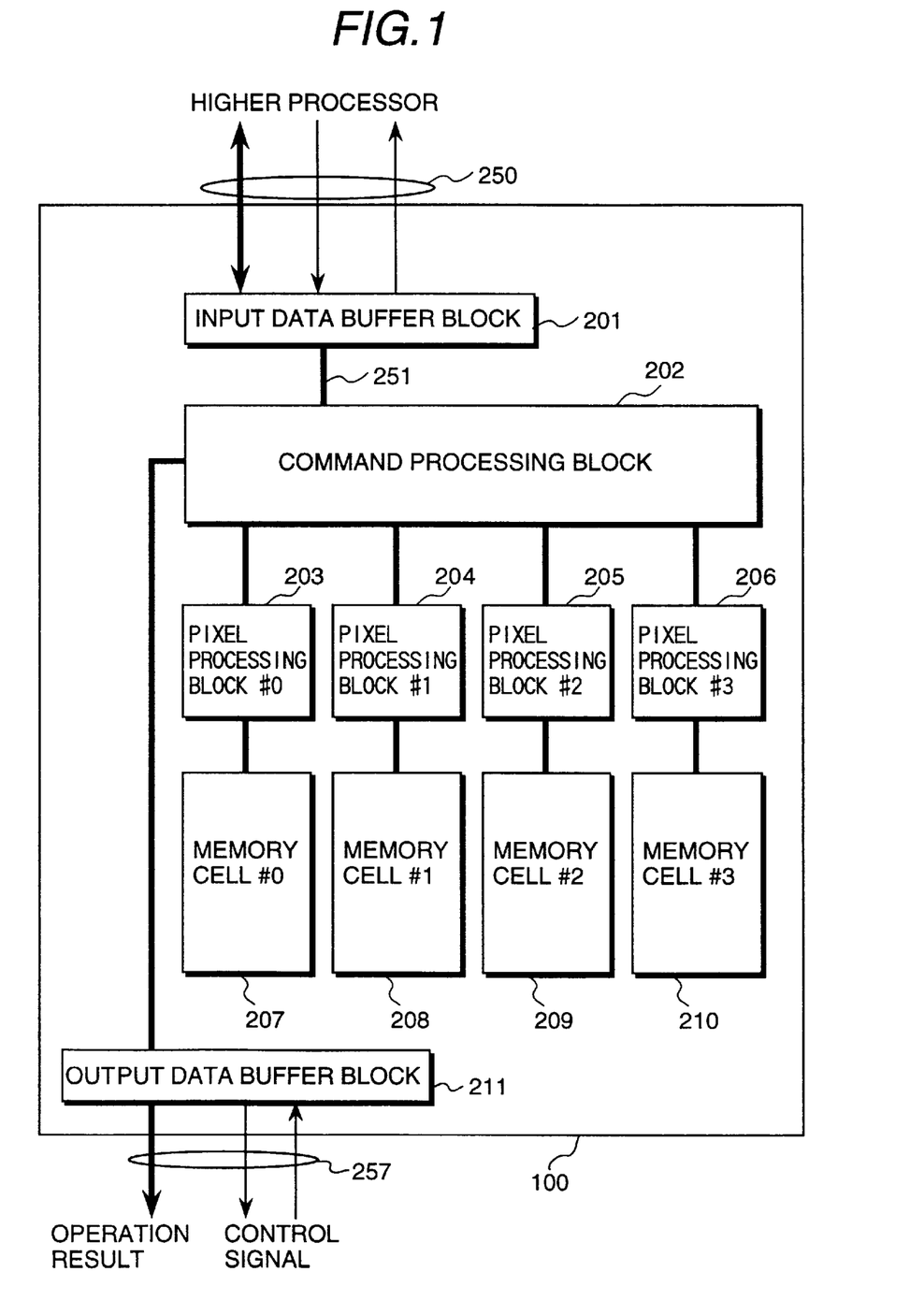
FIG. 1 is a block diagram illustrating a semiconductor memory, having an arithmetic function according to one embodiment of the present invention.

The following describes an example of the internal constitution of a semiconductor memory having an arithmetic function with reference to FIG. 1.

A semiconductor memory 100 having an arithmetic function comprises an input data buffer block 201 that receives an address, write data and control-signal transmitting signal line group 250 from a higher processor and buffers an access request coming from the higher processor; a command processing block 202 that receives the buffered access request from the higher processor sent over the signal line group 251, decodes the request, converts decoded requests into actual memory addresses to control the access of pixel processing blocks 203, 204, 205, and 206 for performing parallel processing for each pixel, and instructs these blocks to perform interpolation; the pixel processing blocks 203, 204, 205, and 206 that read the according to the instruction issued from the command processing block 202 to multiply pixel data by a weight coefficient; memory cells 207, 208, 209, and 210 that actually store data; and an output data buffer block 211 that receives a result of the interpolation performed by the command processing block 202 to output the result to the outside of the chip.

To interpolate a two-dimensional image, the higher processor stores two-dimensional image data to be stored via the signal line group 250. Next, selection between linear interpolation, quadratic interpolation, and use of a fixed weight coefficient is set to a MOD register (not shown). Then, when an address (coordinates) to be read is set from the signal line group 250, the command processing block 202 calculates addresses to be given to the four pixel processing blocks 203, 204, 205, and 206 and obtains a weight coefficient for each pixel from the fraction component of the specified address. Next, the four pixel processing blocks 203, 204, 205, and 206 read the pixel data of the specified addresses, multiply the pixel data by the specified weight coefficient and return multiplication results to the command processing block 202. The returned multiplication results are added together and an addition result is outputted to the higher processor as the read data via an output data buffer.

Figure 3:
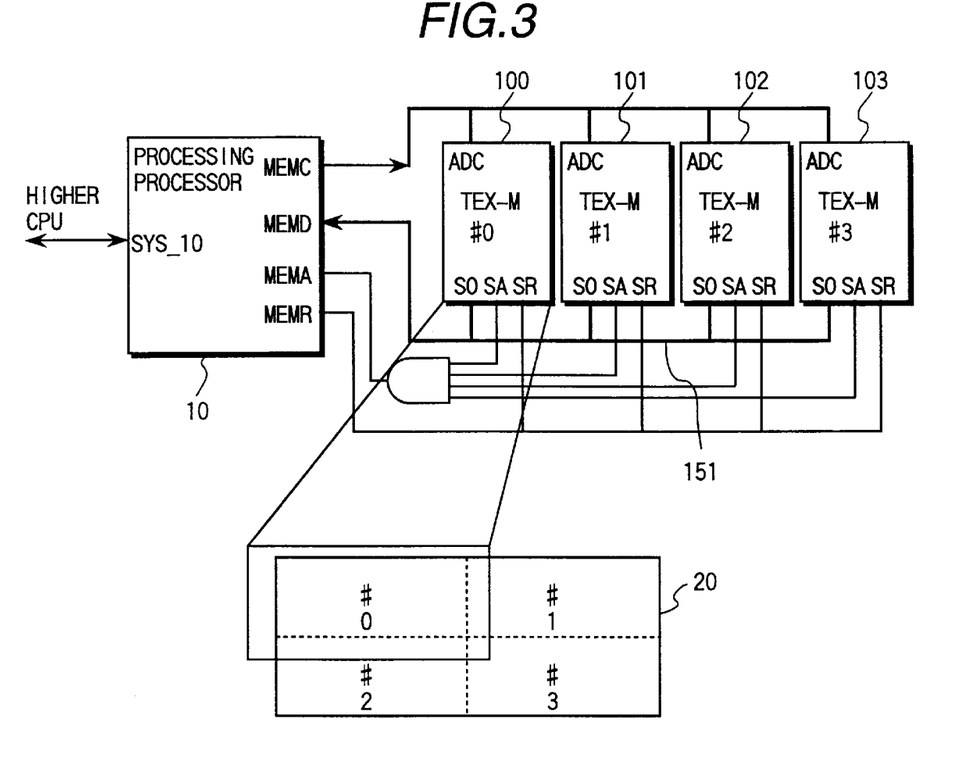
FIG. 3 is a block diagram illustrating a processing apparatus using a plurality of semiconductor memories having an arithmetic function.

The following describes an example of the constitution of a processing apparatus for performing high-speed processing of a large amount data by use of this semiconductor memory having an arithmetic function with reference to FIG. 3. FIG. 3 illustrates a part of an image processing apparatus for performing arithmetic processing based on a two-dimensional original image. A processing processor 10 generates a coordinate of a pixel as instructed from a higher CPU and accesses semiconductor memories 100, 101, 102, and 103, each having an arithmetic function, for reading. In a graphic display apparatus, for example, this processing processor 10 holds texture mapping data in the semiconductor memories 100, 101, 102, and 103, generates a texture data coordinate for every pixel from the coordinate values corresponding to the vertexes of a triangle, reads interpolated pixel information, and writes this information to a frame memory (not shown). The outline of this processing is disclosed in the above-mentioned Japanese Non-examined Patent Publication No. Hei 5-298455.

In FIG. 3, an original image 20 is too large to be stored in one semiconductor memory having an arithmetic function. Therefore, the image is divided into four areas with the boundaries overlapping as shown. The processing processor generates an address (coordinates) which is larger than the space of the data stored in each of the memories for access, so that the semiconductor memories 100, 101, 102, and 103 determine whether an output can be made to the respective specified addresses. As a result of the determination, only the semiconductor memory whose output data is valid is enabled to output an interpolation output to a read data bus 151. To specify which of the areas each semiconductor memory 100, 101, 102, 103 is to be related to, a dedicated signal line is provided for each semiconductor memory. Alternatively, this specification may be made by providing an internal register for area determination. The following briefly describes an operation of the processing apparatus that uses a plurality of semiconductor memories having arithmetic functions 100, 101, 102, 103, as shown in FIG. 3. The processing processor 10 outputs an address signal including a fraction component and a control signal to the semiconductor memories from an MEMC terminal. When each semiconductor memory has obtained an interpolation result for the specified address, the memory outputs a signal indicating the end of the processing to an SA terminal and the interpolation result to an SO terminal. However, since only one semiconductor memory is read for the request address from the processing processor, the SA terminals of the other semiconductor memories are "valid" and the SO terminals of these memories are put in a high-impedance state. The processing processor reads the read data bus 151 if the result of an AND operation between the outputs of the SA terminals of all memories is "valid," asserts an MEMR terminal after completion of the reading, and requests next data output. Thus, the reading can be performed from the processing processor in a pipeline manner.

The following describes an example of the internal constitution of the semiconductor memory having an arithmetic function with reference to FIGS. 4 through 8.

Figure 4:
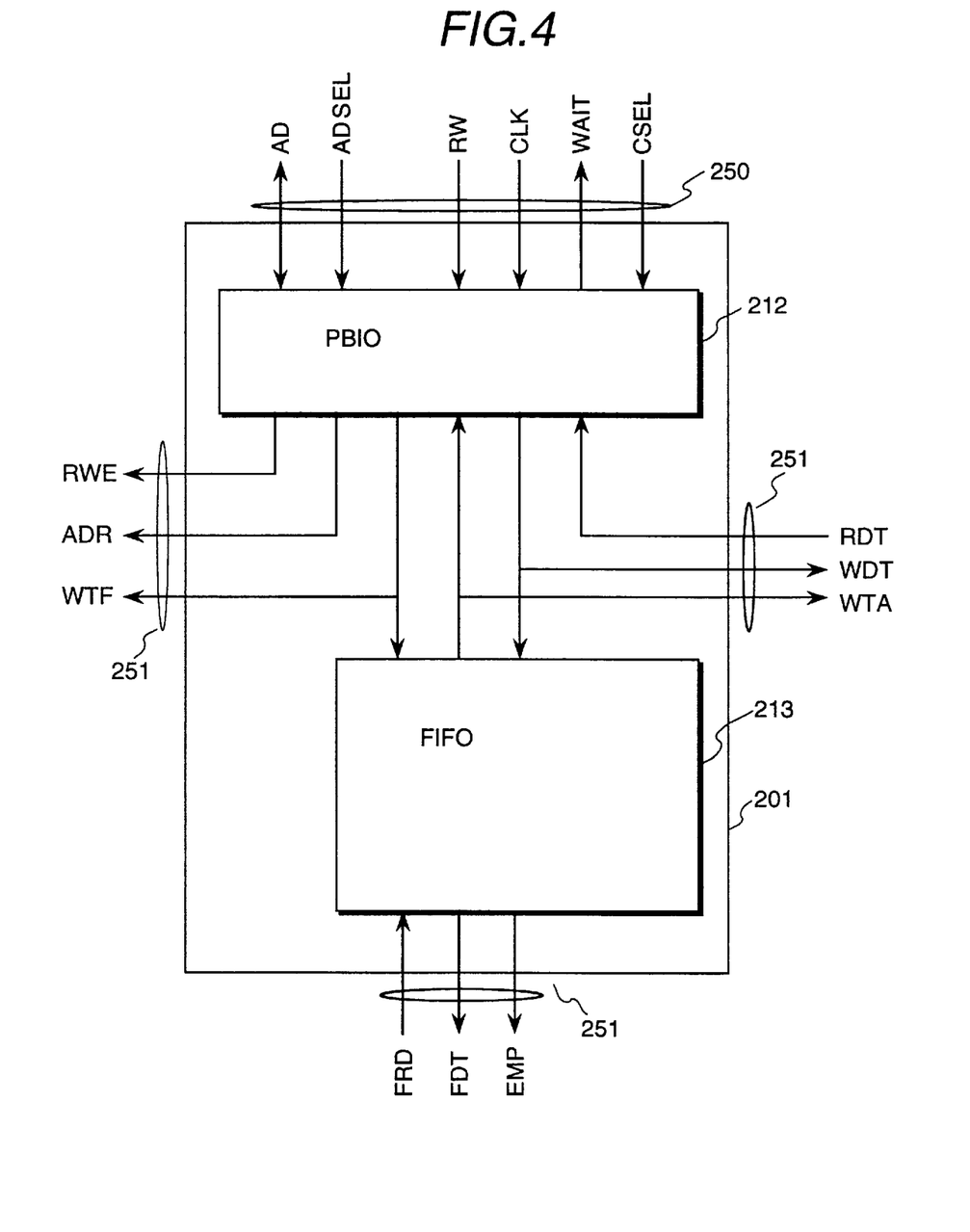
FIG. 4 is a block diagram illustrating an example of the input data buffer block shown in FIG. 1.

FIG. 4 illustrates details of the input data buffer block 201. The input data buffer block 201 is largely composed of a PBIO (Processor Buffer Interface) 212 for receiving an access request from the higher processor and decoding the received request and a FIFO (First In, Fast Out) buffer 213 for buffering the received access requests. There are four types of accesses to be requested from the higher processor: a direct memory access for accessing memory like an ordinary linear address; a register access for reading and writing a register internal to the semiconductor memory having an arithmetic funtion; a two-dimensional write access for writing a memory cell in two-dimensional space; and an interpolation read access for reading interpolation data by specifying a two-dimensional coordinate having a fraction component. Basically, these accesses are classified by the address spaces to be specified.

First, the signal line group 250 between the higher processor and the PBIO will be described. A signal line AD provides a signal for transmitting an address and data, a signal line ADSEL provides a signal indicating whether an address or data is carried on the signal line AD, a signal line RW provides a signal indicating a read access when high and a write access when low, a signal line CLK provided a clock signal, a signal line WAIT provides a signal indicating access enable, and a signal line CSEL provides a signal indicating that an access request is valid.

Next, a procedure in which the higher processor performs direct memory access will be described. First, the higher Processor specifies an address via the signal line ADSEL, sets memory address information of a direct memory access on signal line AD of which the most significant two bits are "00" for example for accessing the signal line AD, sets the signal line RW to high level for a read operation, and sets the signal line CSEL to the access enabled state. When the signal line CLK rises with the signal line WAIT in the access enabled state, a read access operation of direct memory access starts and the access information is stored in the FIFO 213. Then, the content of the FIFO 213 is read by the command processing block 202 and after the pixel processing block reads data from a memory cell, the read data is inputted in the PBIO 212 of the input data buffer block 201 via a signal line RDT. On the other hand, when the higher processor specifies data via the signal line ADSEL after address setting, the signal line AD shifts to a state in which data is outputted from the semiconductor memory. By reading the data on the signal line AD at a cycle in which the read data comes, the read operation comes to an end. This cycle in which the read data comes is determined by a maximum time of memory cell reading. The cycle is ten and several clock pulses. This direct memory access is for use in effecting a memory check. Therefore, this direct memory access does not especially require a high-speed operation, presenting no problem in the above-mentioned access procedure. The write access of the direct memory access is implemented by setting the signal line RW to a write state in the above-mentioned read access operation. The signal value of the signal line AD with the address set is captured, in the input state, into the PBIO 212 and stored in the FIFO 213 as write data. At this moment, the access by the higher processor comes to an end. Subsequently, in the memory having arithmetic function, this access information is taken by the command processing block out of the FIFO 213 and written to the corresponding memory cell via the pixel processing block.

In register access, access can be made by providing a register space in which the most significant two bits of an address to be specified are "01" for example. When viewed from the higher processor, read access and write access are generally the same except that there is no direct memory access and no waiting time for read data. On the other hand, in the input data buffer block, a register access request is not stored in the FIFO 213 and a register write signal RWE, a register address ADR, and write data WDT are generated to directly control the actual register.

Two-dimensional write access is performed in the same manner as the write operation in direct memory access. When an address is set, the most significant two bits of the address signal are set to "10" for example and the X and Y coordinates are set to the subsequent bits.

In interpolation read access, which is like two-dimensional write access, read access is specified with the signal line RW at high level. For the address to be specified, the most significant two bits of the address signal are set to "11" for example and the X and Y coordinates are set to the subsequent bits. However, this interpolation read access differs from the other access methods in that the interpolated read data is read from the signal line 250 and written to the higher processor, thereby allowing the next cycle with an address set to continuously set an address. Therefore, unless the FIFO 213 is stuffed up, access operations can be performed continuously, realizing high-speed access.

The following describes the operation of the FIFO 213. First, when performing access to the FIFO 213 of the above-mentioned four types of access operations, the PBIO 212 outputs data to be written to the FIFO 213 to the signal line WDT and a signal for instructing a write operation to the FIFO 213 to a signal line WTF. At this moment, if the FIFO 213 is full, a signal line WTA issues an access disabled signal, and therefore the FIFO 213 does not accept the write operation. The data to be stored in the FIFO 213 includes an address of direct memory access, data at the write operation, an address and data for two-dimensional write access, an address of interpolation read access, and information for identifying these addresses and data. If any one piece of this data is stored in the FIFO 213, a signal line EMP is negated, upon which data of the first access request is outputted to a signal line FDT. To read this data, the command processing block 202 asserts a signal line FRD. This asserts the signal line EMP when the FIFO 213 is emptied, notifying the command processing block that there is no access request to be outputted.

Figure 5:
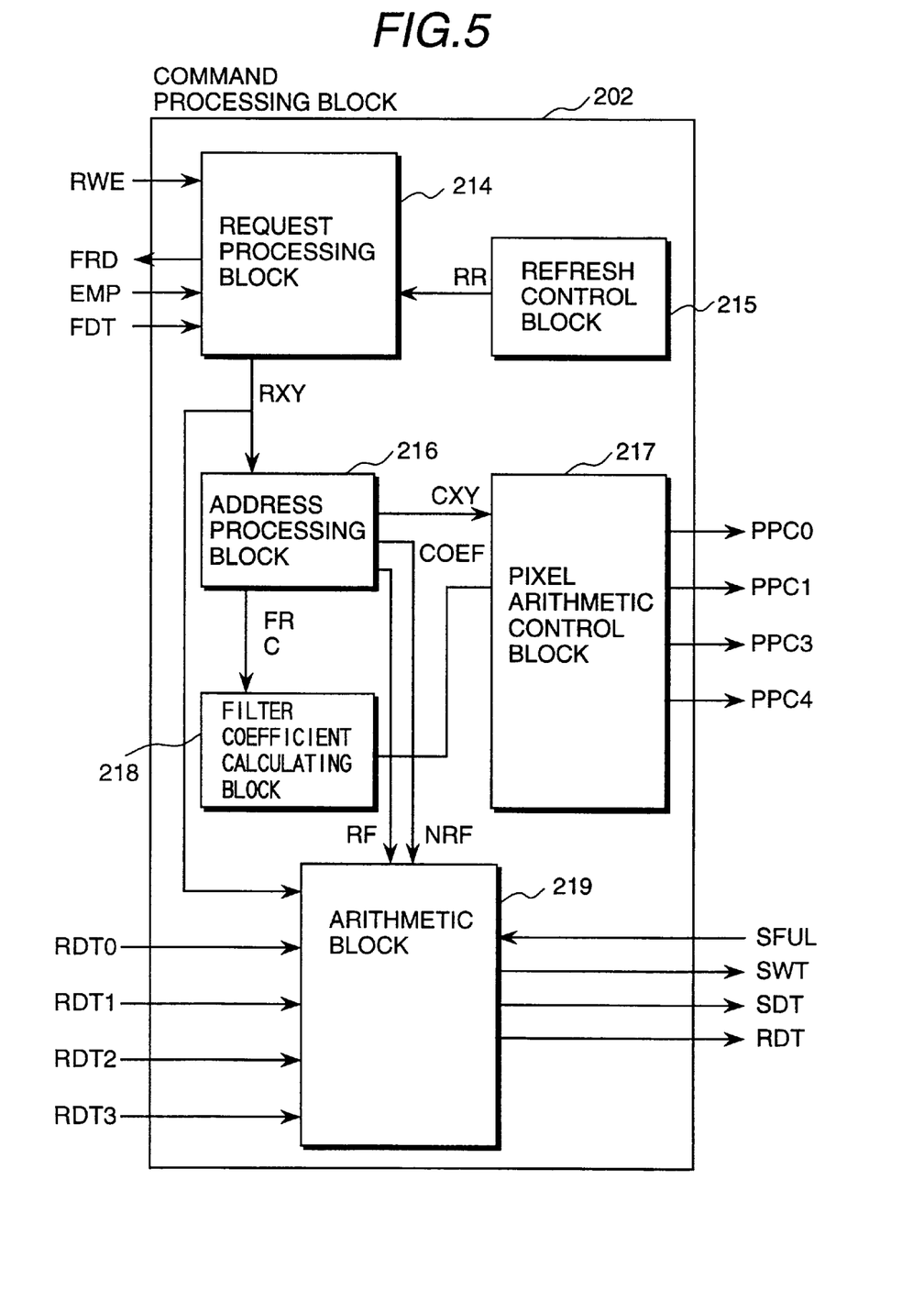
FIG. 5 is a block diagram illustrating an example of the command processing block shown in FIG. 1.

The following describes the command processing block 202 with reference to FIG. 5.

The command processing block 202 receives an access request from the input data buffer block 201, performs arbitration with a refresh cycle request unique to the dynamic memory, controls the pixel processing blocks 203, 204, 205, and 206, calculates read data, and outputs the obtained read data to the output data buffer block.

The command processing block 202 incorporates a refresh control block for periodically outputting a request signal RR for refreshing a memory cell, which is a dynamic memory, a request processing block 214 for performing arbitration between an access request from the input data buffer block 201 and a refresh request from the refresh control block 215 and for processing each of these requests in one to several steps, an address processing block 216 for calculating an address to be given to the pixel processing block from the address (coordinates) coming from the request processing block 214 and the type of access and for determining whether that coordinate can be calculated from the data stored in the memory cell of the address processing block, a filter coefficient calculating block 218 for calculating from the fraction component of the address a weight coefficient to be multiplied by a pixel, a pixel arithmetic control block 217 for controlling the pixel processing blocks 203, 204, 205, and 206 by means of the address coming from the address processing block 216 and the weight coefficient coming from the filter coefficient calculating block 218, and an arithmetic block 219 for performing an arithmetic operation on the data obtained by multiplying the pixels outputted from the pixel processing blocks 203, 204, 205, and 206 by the weight coefficient and for sending its result to the output data buffer.

First, the refresh control block 215 calculates time in synchronization with the clock and outputs a refresh request signal RR about every 10 µs.

The request processing block 214 knows by the signal line EMP that an access request has come to the input data buffer block 201, thereby capturing the access request on the signal line FDT. At the same time, by asserting the signal line FRD, the request processing block can put a next access request onto the signal line FDT. Also, the request processing block 214 receives the above-mentioned refresh request signal RR to know that refresh is necessary. First, when the request processing block 214 receives a refresh request signal RR in the idle state, the request processing block counts up an internal refresh counter and outputs the count and a flag indicating the refresh request to a signal line RXY. If there is no refresh request and the signal line EMP is not asserted, the request processing block takes the access request from the signal line FDT and stores the access request into an internal access request register. Then, the request processing block operates as follows according to each access request. First, when a read request for direct memory access comes, the request processing block outputs a specified address and a flag of the read request for direct memory access to the signal line RXY. When a write request for direct memory access comes, the request processing block outputs a specified address and a flag of the write request for direct memory access to the signal line RXY and outputs write data to the signal line RXY in the next cycle. The write data at this point is stored in the FIFO 213 next to the write address. In two-dimensional write access, the request processing block outputs a specified coordinate and a flag of a two-dimensional write access request to the signal line RXY and outputs write data to the signal line RXY in the next cycle. For an interpolation read access, the request processing block outputs a specified coordinate and a flag of the interpolation read access request to the signal line RXY. At this point, since there are four pixel processing blocks, if four pixels are read for processing, the processing can be made without change; however, if 16 pixels are read for processing, for example, control is performed such that the 16 pixels are processed in units of four pixels from the top down. To do so, the flag of the interpolation read access request includes a value that indicates a number of the four-pixel group. In this processing, one interpolation read access is completed in four cycles.

The address processing block 216 knows by the access request flag on the signal line RXY that there is a request, performs address conversion and outputs it to the pixel arithmetic control block 217 accordingly. First, if the access request flag on the signal line RXY indicates a refresh request, the address processing block 216 outputs the address (counter value) and the flag to a signal line CXY without change. The signal line CXY includes access request flag signal lines for the four pixel processing blocks and signal lines for address or data transmission. When issuing a refresh request, the address processing block outputs the refresh request to all signal lines of the four pixel processing blocks in the same manner. Next, if the access request flag on the signal line RXY indicates a direct memory access read operation, the address processing block outputs the address and the flag to the signal line CXY connected to the pixel processing block to which the memory cell corresponding to the specified address is connected. If the access request flag indicates a direct memory access write operation, the address processing block outputs the address and the flag to the signal line CXY connected to the pixel processing block to which the memory cell corresponding to the specified address is connected and outputs write data in the next cycle. If the access request flag on the signal line RXY indicates a two-dimensional write access operation, the address processing block outputs the address and the flag to the signal line CXY connected to the pixel processing block to which the memory cell corresponding to the specified address is connected and, at the same time, outputs write data in the next cycle. If the access request flag on the signal line RXY indicates an interpolation read access operation, the address processing block transfers the fraction part of the address coordinates) to the filter coefficient calculating block 218 via a signal line FRC and, at the same time, outputs the address and the flag corresponding to each pixel processing block to the signal line CXY. As described above, for interpolation requiring more than four pixels to be read, the address processing block outputs the address and the flag to the signal line CXY while changing the addresses corresponding to the pixel processing blocks.

The following shows a relationship between the memory addresses and the coordinates in direct memory access, two-dimensional write access, and interpolation read access. First, the memory addresses are continuously provided in the order of memory cells 207, 208, 209, and 210. Coordinates (0,0) correspond to address 0 of the memory cell 207, coordinates (0,1) correspond to address 0 of the memory cell 208, coordinates (1,0) correspond to address 0 of the memory cell 209, coordinates (1,1) correspond to address 0 of the memory cell 210, and coordinates (2,0) correspond to address 1 of the memory cell 207. Thus, a pixel of which X coordinate is an even number and Y coordinate is an even number corresponds to the memory cell 207, a pixel of which X coordinate is an even number and Y coordinate is an odd number corresponds to the memory cell 208, a pixel of which X coordinate is an odd number and Y coordinate is an even number corresponds to the memory cell 209, and a pixel of which X coordinate is odd number and Y coordinate is an odd number corresponds to the memory cell 210. As with the processing apparatus of FIG. 3 in which a plurality of semiconductor memories having an arithmetic function are used by dividing an area the above-mentioned relationship between addresses and coordinates is relatively the same with offsets attached. Namely, address 0 of the memory 207 corresponds to coordinates (512,0) and address 0 of the memory cell 208 corresponds to coordinates (512,1) for example. These offset values are determined by a signal (not shown) that performs chip area specification, is directly set from outside of the LSI, and is used in the address processing block 216. When the processing apparatus is composed of a plurality of semiconductor memories having an arithmetic function, such as mentioned above, the address processing block 216 determines where the data for interpolating specified coordinates is located in its own memory cell. If the interpolation is found to be practicable, the address processing block outputs an access request to the pixel processing block 217 via the signal line CXY as described above and, at the same time, outputs a signal RF indicating an output of the access request to the arithmetic block 219. If the interpolation is found to be impracticable. the address processing block outputs a signal NRF indicating that the access request is disabled for an arithmetic operation to the arithmetic block 219. The determination whether the above-mentioned data for interpolation is located in its own memory cell can be easily implemented by a comparator.

The filter coefficient calculating block 218 calculates a weight coefficient to be multiplied by each pixel in an interpolation read access. To be more specific, the filter coefficient calculating block calculates weight coefficients shown in the above-mentioned expressions (1), (2), and (3) from the fraction part of coordinates and outputs the calculated coefficients to the pixel arithmetic control block via a signal line COEF. The processing for obtaining weight coefficients can easily be implemented by a multiplier and an adder. Interpolation by a cubic expression requires division by three. In this case, too, the processing can be implemented by multiplication of a constant of $\frac{1}{3}$. If the number of digits of a fraction part is small, a coefficient can be obtained by table reference using coefficients stored in memory. Without using the fraction part of coordinates, a Laplacian filter can be implemented in the same procedure as interpolation read access by providing a register for holding a Laplacian filter coefficient.

The pixel arithmetic control block 217 distributes addresses from the address control block 216 for the pixel processing blocks 203, 204, 205, and 206, a flag indicating the type of access, and a weight coefficient COEF for use at interpolation read access to the pixel processing blocks 203, 204, 205, and 206.

The arithmetic block 219 receives the signal RF indicating that a read request has been outputted and, after passing of a certain time, captures read data RDT0 through RDT 3 from the pixel processing blocks 203, 204, 205, and 206 to add the data together. The arithmetic block outputs the addition result to a signal line SDT and sets to a signal line SWT that the addition result is "valid" and "the addition result is outputted from the semiconductor memory having arithmetic function." If the output data buffer block is stuffed up and therefore no more data can be accepted, a signal line SFULL is asserted, so that, at that moment, the state of the arithmetic block 219 must not be changed. Normally, "valid" is set to the signal SWT, upon which a next arithmetic operation can be started. To perform interpolation from 16 pixels, the addition result is internally held and the output is made at the fourth time, making the signal SWT "valid". If the signal NRF indicating no interpolation output is asserted in this LSI, the arithmetic result is uncertain and the signal SWT is set to "valid" and "the interpolation result is not outputted from the semiconductor memory having arithmetic function."

The above-mentioned description is related to an example of interpolation read access. In the case of direct memory access read, the corresponding one from the read data RDT 0 through RDT 3 is outputted to the line RDT according to the signal RXY including the specified coordinates.

Figure 6:
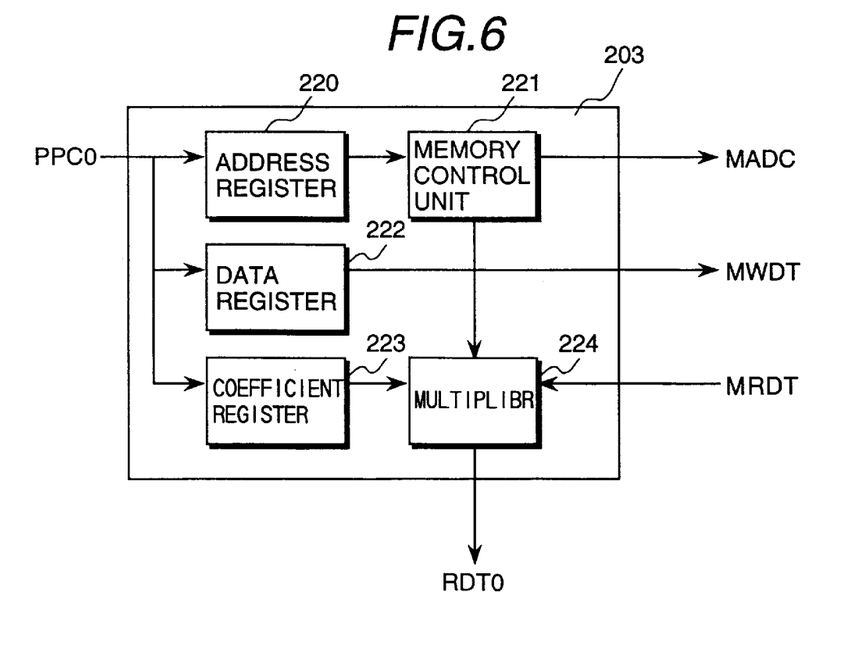
FIG. 6 is a block diagram illustrating an example of the pixel processing block shown in FIG. 1.

The following describes the pixel processing block 203 with reference to FIG. 6.

First, a signal PPC0, which is the input to the pixel processing bloc, is composed of an address indicating coordinates, a flag indicating an access type, a weight coefficient, and write data for data write access. In every access mode, an address is stored in an address register 220 first and converted by a memory control unit into a memory cell address, which is outputted with a control signal to a signal line MADC. In interpolation read access, a weight coefficient is stored in a coefficient register 223. In direct memory access write and two-dimensional write access, the data to be written after the address is set to the signal PPC0, so that this write data is stored in a data register.

When a certain time passes after the memory control unit 221 outputs a data read request from a memory cell, the read data is set to a read signal line MRDT. This time is determined by the address for the memory cell. If the address of the data currently read to a sense amplifier 229 is specified, the read data is set after one clock. If the address of data not in the sense amplifier 229 is specified, the read data is set after six clocks.

The read data is multiplied in a multiplier 224 by the value of the coefficient register and the result is passed to the command processing block 202 via a signal RDT0. The pixel processing blocks 204, 205, and 206 have the same constitution as the pixel processing block 203 because the command processing block 202 accesses each pixel processing block with differences in operation taken into consideration.

Figure 7:
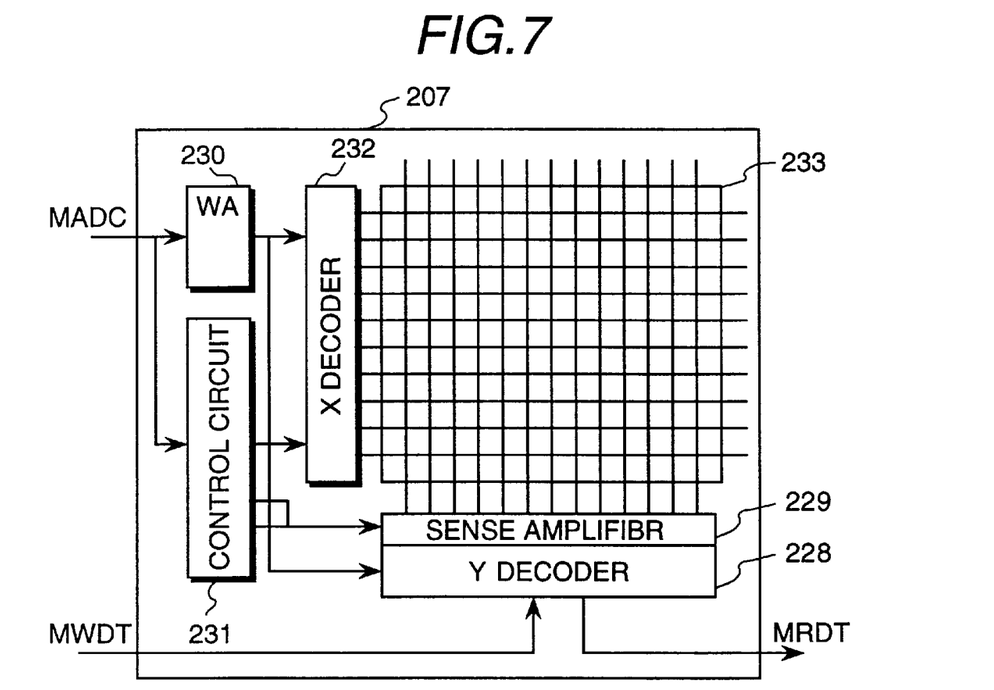
FIG. 7 is a block diagram illustrating an example of the memory cell shown in FIG. 1.

The following describes the memory cell 207 with reference to FIG. 7.

The memory cell 207 is composed of a register WA 230 for storing address data on the signal MADC, a storage element 233 arranged on a two-dimensional grid, an X decoder 232 for selecting one row of storage elements 233, a sense amplifier 229 for reading data of one row of storage elements 233 and for storing the read data, a Y decoder for selectively reading and writing one pixel of data stored in the sense amplifier according to the address held in the register WA230, and a control circuit 231 for controlling the X decoder 232, the sense amplifier 229, and the Y decoder 228 according to the control signal on the signal line MADC.

The memory cell shown is the same as the cell of an ordinary dynamic memory and not a special memory cell. The control signal on the signal line MADC can be specified with an operation for reading one row of storage elements 233 selected by the X decoder into the sense amplifier 229, an operation for capturing one pixel of data from the data located on the sense amplifier 229 and outputting the captured data to the signal MRDT, an operation for writing the value of a signal MWDT of write data to the sense amplifier 229, and an operation for writing the data of the sense amplifier 229 selected by the X decoder to one row of storage elements 233. According to these specifications, the control circuit 231 controls the X decoder 232, the sense amplifier 229, and the Y decoder 228.

Figure 8:
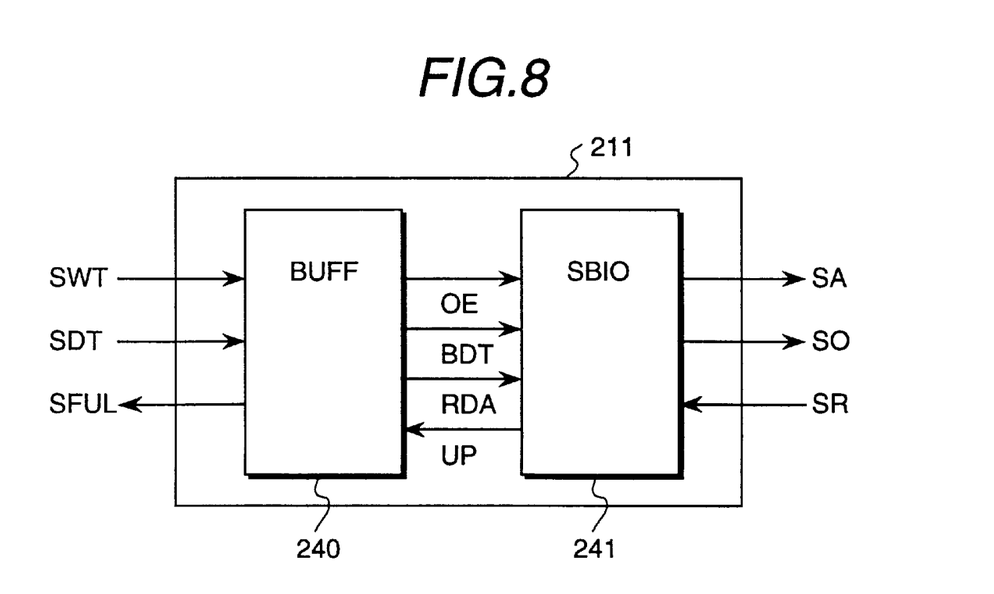
FIG. 8 is a block diagram illustrating an example of the output data buffer block shown in FIG. 1.

The following describes the output data buffer block 211 with reference to FIG. 8.

The SDT signal, which is data concerning an interpolation result coming from the command processing block 202, is stored in a buffer BUFF 240 along with a flay "output from the semiconductor memory having arithmetic function" according to the "valid" flag indicated by the SWT. This buffer BUFF 240 is a FIFO. Therefore, if no more data can be stored therein, a SFULL signal is asserted. If the buffer BUFF 240 contains data, the buffer asserts a signal RDA and outputs valid data to a BDT and the flag "output from the semiconductor memory having arithmetic function" to a signal line OE. When a data update signal UP comes from an output block SBIO 241, the buffer outputs the buffered data to the signal lines BDT, RDA, and OE.

The output block SBIO 241 is a simple LSI input/output driver. When OE is asserted, the output block outputs the value of the signal BDT to a signal line SO; when OE is negated, the output block puts the signal line SO into high-impedance state. Signal lines SA and SR are connected to the line RDA and the line UP without change via a driver.

Lastly, a processing apparatus for processing a large image by use of a plurality of semiconductor memories having an arithmetic function will be described with reference to FIG. 3.

In what follows, an example of image enlargement processing will be shown. First, image data 20 of an original image to be enlarged is stored in the semiconductor memories 100, 101, 102, and 103 by the higher CPU via the processing processor. At this point, the processing processor 10 provides an integer address (coordinates) and then its data to the signal terminal MEMC in a two-dimensional write access, thereby setting the pixel of the image data 20 of the original image to the semiconductor memory having an arithmetic function. At this point, each semiconductor memory having an arithmetic function determines by the address processing block 216 whether the area is its own area. If the area is found to be its own area, the semiconductor memory performs a write access from the pixel arithmetic control block 217 to the corresponding memory cell. The relationship between this semiconductor memory and the image data 20 of the original image ,is a slightly larger area than each of the equally divided areas of the image data 20 of the original image as shown by the extension line drawn from the semiconductor memory of FIG. 3. Namely, each semiconductor memory has, in an overlapping manner, pixels around the boundary between the divided areas of the image data 20 of the original image. The size of the overlapping area depends on the degree of interpolation. In interpolation by a linear expression, the size is one pixel. In interpolation by quadratic and cubic expressions, the size is two pixels. Thus, each semiconductor memory can read the pixels of an original image for interpolation inside its own LSI.

The following describes the processing for reading given coordinates of the image data 20 of an original image. The processing processor 10 gives an address (coordinates) having a fraction component to the signal terminal MEMC in an interpolation read access. This address can be obtained by sequentially adding about 0.77, which is the reciprocal number of 13 if the image is to be enlarged thirteen fold for example. The address thus obtained can be given continuously until a WAIT signal of a signal line group ADC is asserted. Meanwhile, if this interpolation read access is made, the semiconductor memory having an arithmetic function causes the address processing block 216 of the command processing block 202 to determine whether the specified address is the address to be outputted by the semiconductor memory as described before and outputs the interpolation result to the output data buffer block 211. If the address is the address to be outputted by the semiconductor memory the SA terminal of the same is asserted upon obtaining of the interpolation result. If the address is not the address to be outputted, the SA terminal is asserted once for each interpolation read access. The signal of the SA terminal is connected to a MEMA terminal of the processing processor 10, through an AND gate, by which the processing processor 10 can know that the read result for one interpolation read request has been established. If the processing processor 10 captures this data to request a next interpolation read result, asserting a MEMR terminal connected to the SR terminal of each semiconductor memory outputs the next interpolation read result to the SO terminal.

Repeating the above-mentioned processing provides the pixel data of a new image resulting from enlarging the image data 20 of the original image. The new image thus obtained is written by a terminal not shown of the processing processor to the image memory to be displayed on a CRT or the like.

As described and according to one embodiment, memory access is made inside the LSI chip, so that, if the number of signal lines connected to the higher processor is equal to the signal frequency, the processing speed is increased four times, four being the degree of memory access parallelism, namely the number of pixel processing blocks. Inside the LSI, the processing speed increases still further because of the small wiring capacitance. Conversely, to implement the same performance by a prior-art constitution, parallelism of more than four times is required, thereby increasing the equipment size and cost.

The pixel processing blocks having a multiplier in units of pixels are provided and multiplication is performed in parallel, thereby enabling interpolation for image reduction and enlargement at a high speed.

If a plurality of semiconductor memories having an arithmetic function are used in order to handle a large image, a circuit is provided for determining that a slightly smaller area than the area of an image stored in each semiconductor memory is the area to be outputted by that semiconductor memory By this novel constitution, an address space larger than the address space of the actually stored data and a small address space between adjacent pieces of data can be set when the semiconductor memories are viewed from the upper processor.

Thus, the present embodiment has been described mainly with respect to enlargement and reduction of a two-dimensional image. It will be apparent that the same effect can be obtained by the same constitution with respect to a three-dimensional image and a four-dimensional image (the fourth dimension may be time axis or the four-dimensional image may be a plurality of prefiltered three-dimensional images).

By use of the constitution briefly described with reference to the present embodiment, image processing, such as with a Laplacian filter, can be performed.

As described and according to the present invention, an address having a fraction component may be specified to the data stored at an integer address, thereby providing interpolated data at a high speed.

By holding the data of a larger address space than the address space outputted by one semiconductor memory having an arithmetic function, data interpolated at a high speed and a low cost may be provided for the data of a huge address space by use of a plurality of semiconductor memories having an arithmetic function.

What is claimed is:

1. A semiconductor memory having an arithmetic function comprising:

storage means for holding data corresponding to continuous integer addresses;

fraction address holding means for holding an integer component and a fraction component constituting a fraction address inputted from a processor; and arithmetic means for reading data stored in the storage means corresponding to an address indicated by said integer component and data before or after the address indicated by said integer component from said storage means and, by use of the read data and said fraction component held in said fraction address holding means, interpolating data corresponding to said fraction address;

wherein said semiconductor memory has at least a first terminal for inputting and outputting addresses or data to and from the processor, a second terminal for outputting a wait signal to the processor indicating that access is enabled and a third terminal for inputting a signal from the processor indicating that an access request is valid.

2. A semiconductor memory according to claim 1, further comprising address range determining means for determining whether an address is within a range of the addresses of the data held in said storage means.

3. A semiconductor memory according to claim 1, wherein said storage means comprises a DRAM.

4. A semiconductor memory having an arithmetic function comprising:

storage means for holding data corresponding to integer addresses in a continuous N-dimensional space (N being an integer);

fraction address holding means for holding a fraction address inputted from a processor, said fraction address being composed of an integer component, which is an integer address in said N-dimensional space and an N-dimensional fraction component for specifying an address between said integer addresses;

data arithmetic means for reading data corresponding to an address indicated by said integer component and data before and after the address indicated by said integer component in each dimension to perform an arithmetic operation according to the fraction component held in said fraction address holding means; and determining means, responsive to the inputting of an address of a space larger than the integer component, which is said N-dimensional integer address, for determining whether an arithmetic operation result corresponding to the inputted address can be outputted from the data held in said storage means;

wherein, when said N-dimensional fraction address is inputted as an address, an arithmetic operation result of said data arithmetic means is read based on said determining means and is outputted as read data, and wherein said semiconductor memory has at least a first terminal for inputting and outputting addresses or data to and from the processor, a second terminal for outputting a wait signal to the processor indicating that access is enabled and a third terminal for inputting a signal from the processor indicating that an access request is valid.

5. A semiconductor memory according to claim 4, wherein said storage means comprises a DRAM.

6. A semiconductor memory according to claim 1 or claim 2, wherein said storage means, said fraction address holding means and said arithmetic means are formed on a single LSI chip which comprises said semiconductor memory.

7. A semiconductor memory according to claim 1 or claim 2, wherein said storage means, said fraction address holding means and said arithmetic means are formed on a single LSI chip which comprises said semiconductor memory.

8. A processing apparatus using a semiconductor memory having an arithmetic function comprising:

a processing processor for generating an address including a fraction component as instructed from a higher processor; and a plurality of semiconductor memories having an arithmetic function including storage means for holding data corresponding to continuous integer addresses and an arithmetic means for obtaining, for the address including a fraction component inputted from said processing processor, data corresponding to said address including a fraction component by use of the data corresponding to continuous integer addresses held in said storage means and the fraction component of the address;

wherein each of said plurality of semiconductor memories holds part of data of an adjacent memory in said storage means in a mutually overlapping manner, and wherein each of said semiconductor memories has at least a first terminal for inputting and outputting addresses or data to or from the higher processor, a second terminal for outputting a wait signal to the higher processor indicating that access is enabled and a third terminal for inputting a signal from the higher processor indicating that an access request is valid.

9. The processing apparatus using a semiconductor memory having an arithmetic function according to claim 3, wherein said part of data to be held in each semiconductor memory in a mutually overlapping manner denotes data in the proximity of a boundary between the adjacent memories.

10. The processing apparatus using a semiconductor memory having an arithmetic function according to claim 8 or 9, wherein each of said plurality of semiconductor memories having an arithmetic function has address range determining means for determining whether an address including a fraction component inputted from said processing processor is within a range of the addresses of data held in said storage means.

11. A processing apparatus according to claim 8, wherein said storage means comprises a DRAM.

12. A semiconductor memory according to claim 1, further comprising address range determining means for determining whether an address is within a range of the addresses of the data held in said storage means.

13. A semiconductor memory having an arithmetic function comprising:

a memory which holds data corresponding to continuous integer addresses;

a fraction address memory which holds an integer component and a fraction component constituting a fraction address inputted from a processor; and an arithmetic unit which reads data corresponding to an address indicated by said integer component and data before or after the address indicated by said integer component from said storage means and, by use of the read data and said fraction component held in said fraction address memory, interpolates data corresponding to said fraction address;

wherein said semiconductor memory has at least a first terminal for inputting and outputting addresses or data to and from the processor, a second terminal for outputting a wait signal to the processor indicating that access is enabled and a third terminal for inputting a signal from the processor indicating that an access request is valid.

14. A semiconductor memory according to claim 13, wherein the memory which holds data comprises a DRAM.

15. A semiconductor memory having an arithmetic function comprising:

a memory which holds data corresponding to integer addresses in a continuous N-dimensional space (N being an integer);

a fraction address memory which holds a fraction address inputted from a processor, said fraction address being composed of an integer component, which is an integer address in said N-dimensional space and an N-dimensional fraction component for specifying an address between said integer addresses;

a data arithmetic unit which reads data corresponding to an address indicated by said integer component and data before and after the address indicated by said integer component in each dimension to perform an arithmetic operation according to the fraction component held in said fraction address holding means; and a circuit, responsive to the inputting of an address of a space larger than the integer component, which is said N-dimensional integer address, to determine whether an arithmetic operation result corresponding to the inputted address can be outputted from the data held in said storage means;

wherein, when said N-dimensional fraction address is inputted as an address, an arithmetic operation result of said data arithmetic unit is read based on said determining means and is outputted as read data, and wherein said semiconductor memory has at least a first terminal for inputting and outputting addresses or data to and from the processor, a second terminal for outputting a wait signal to the processor indicating that access is enabled and a third terminal for inputting a signal from the processor indicating that an access request is valid.

16. The processing apparatus using a semiconductor memory having an arithmetic function according to claim 12, wherein said part of data to be held in each semiconductor memory in a mutually overlapping manner denotes data in the proximity of a boundary between the adjacent memories.

17. A semiconductor memory according to claim 15, wherein the memory which holds data comprises a DRAM.

18. A processing apparatus using a semiconductor memory having an arithmetic function comprising:

a processing processor which generates an address including a fraction component as instructed from a higher processor; and a plurality of semiconductor memories having an arithmetic function including storage devices which hold data corresponding to continuous integer address and arithmetic units which obtain, for the address including a fraction component inputted from said processing processor, data corresponding to said address including a fraction component by use of the data corresponding to continuous integer addresses held in said storage devices and the fraction component of the address;

wherein each of said plurality of semiconductor memories holds part of data of an adjacent memory in said storage means in a mutually overlapping manner, and wherein each of said semiconductor memories has at least a first terminal for inputting and outputting addresses or data to or from the higher processor, a second terminal for outputting a wait signal to the higher processor indicating that access is enabled and a third terminal for inputting a signal from the higher processor indicating that an access request is valid.

19. The processing apparatus using a semiconductor memory having an arithmetic function according to claim 12 or 13, wherein each of said plurality of semiconductor memories having an arithmetic function has an address range determining unit which determines whether an address including a fraction component inputted from said processing processor is within a range of the addresses of data held in said storage means.

20. A semiconductor memory according to claim 18, wherein the storage devices comprise DRAMs.

* * * * *